April 7, 1964  J. D. TURNER  3,128,014
VARIABLE CALIBRATION SCALE FOR MEASURING BULK MATERIALS
Filed Oct. 2, 1961  3 Sheets-Sheet 2
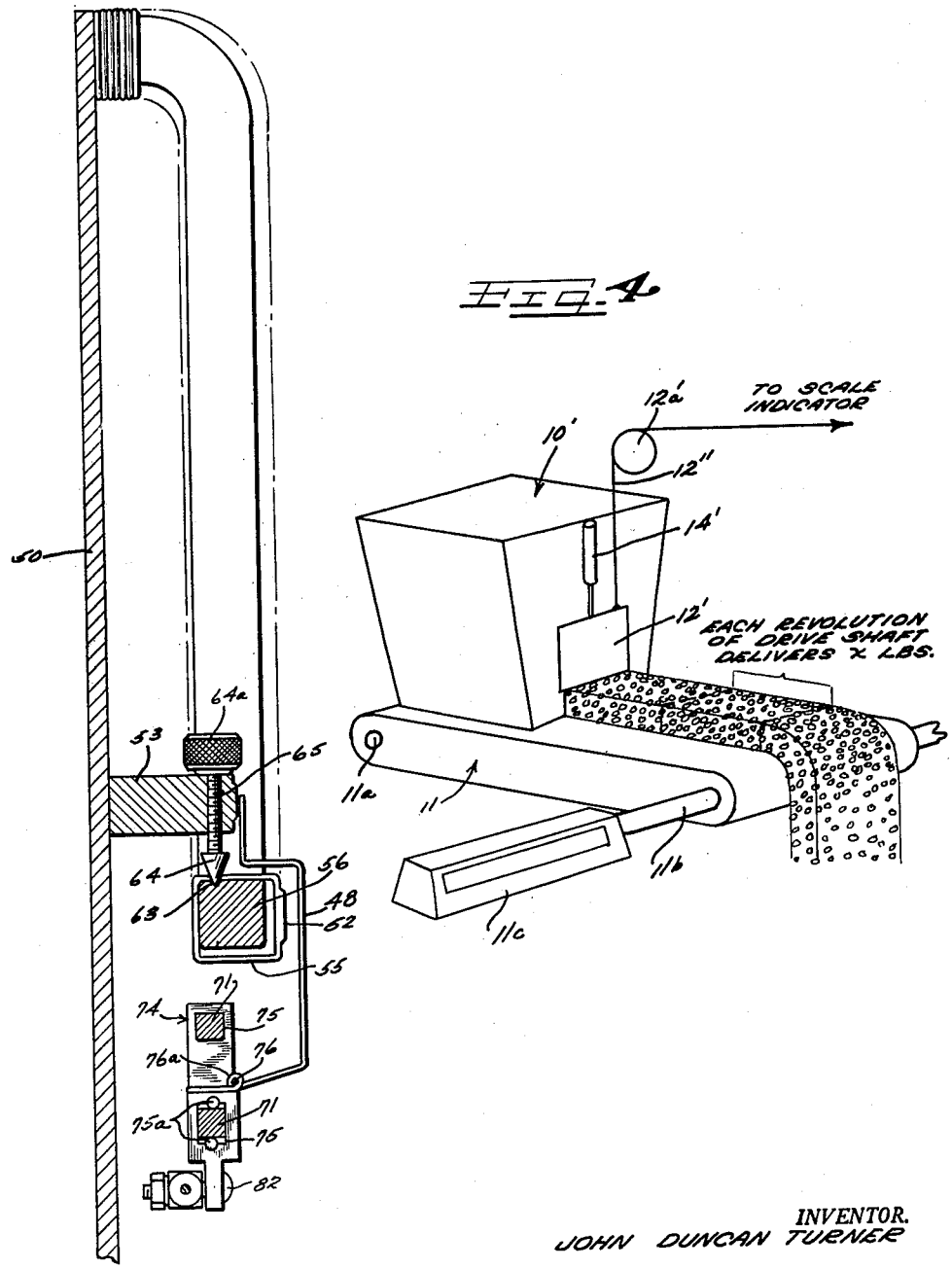
INVENTOR.
JOHN DUNCAN TURNER
BY
ATTORNEYS April 7, 1964 J. D. TURNER 3,128,014
VARIABLE CALIBRATION SCALE FOR MEASURING BULK MATERIALS
Filed Oct. 2, 1961 3 Sheets-Sheet 3
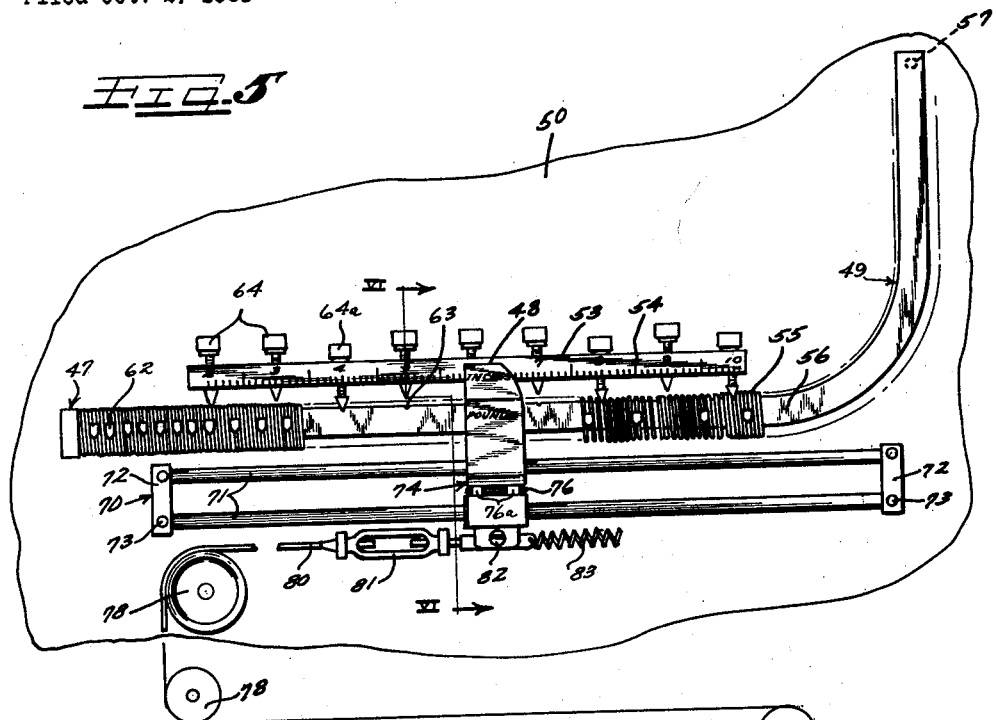
FIG. 5
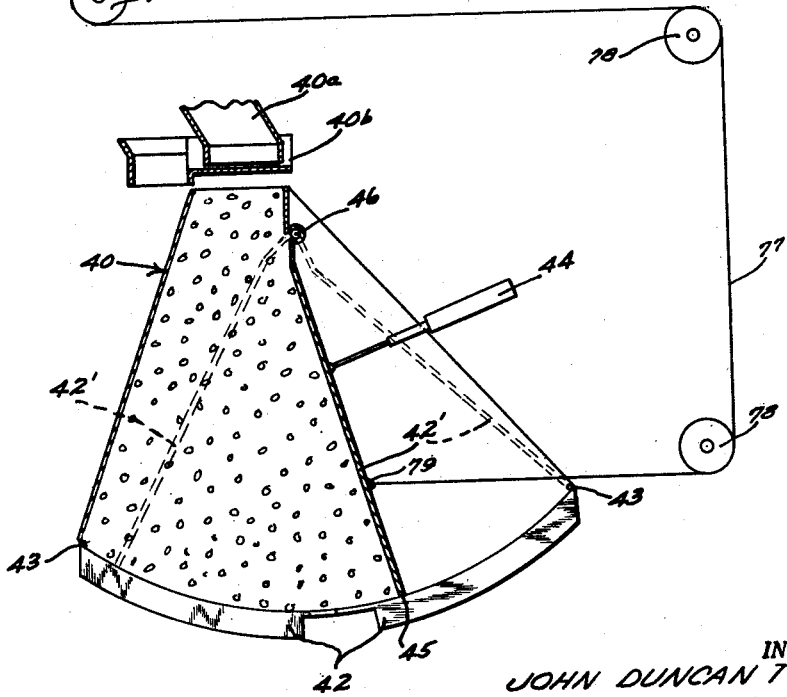
INVENTOR.
JOHN DUNCAN TURNER
BY
ATTORNEYS

United States Patent Office 3,128,014
Patented Apr. 7, 1964

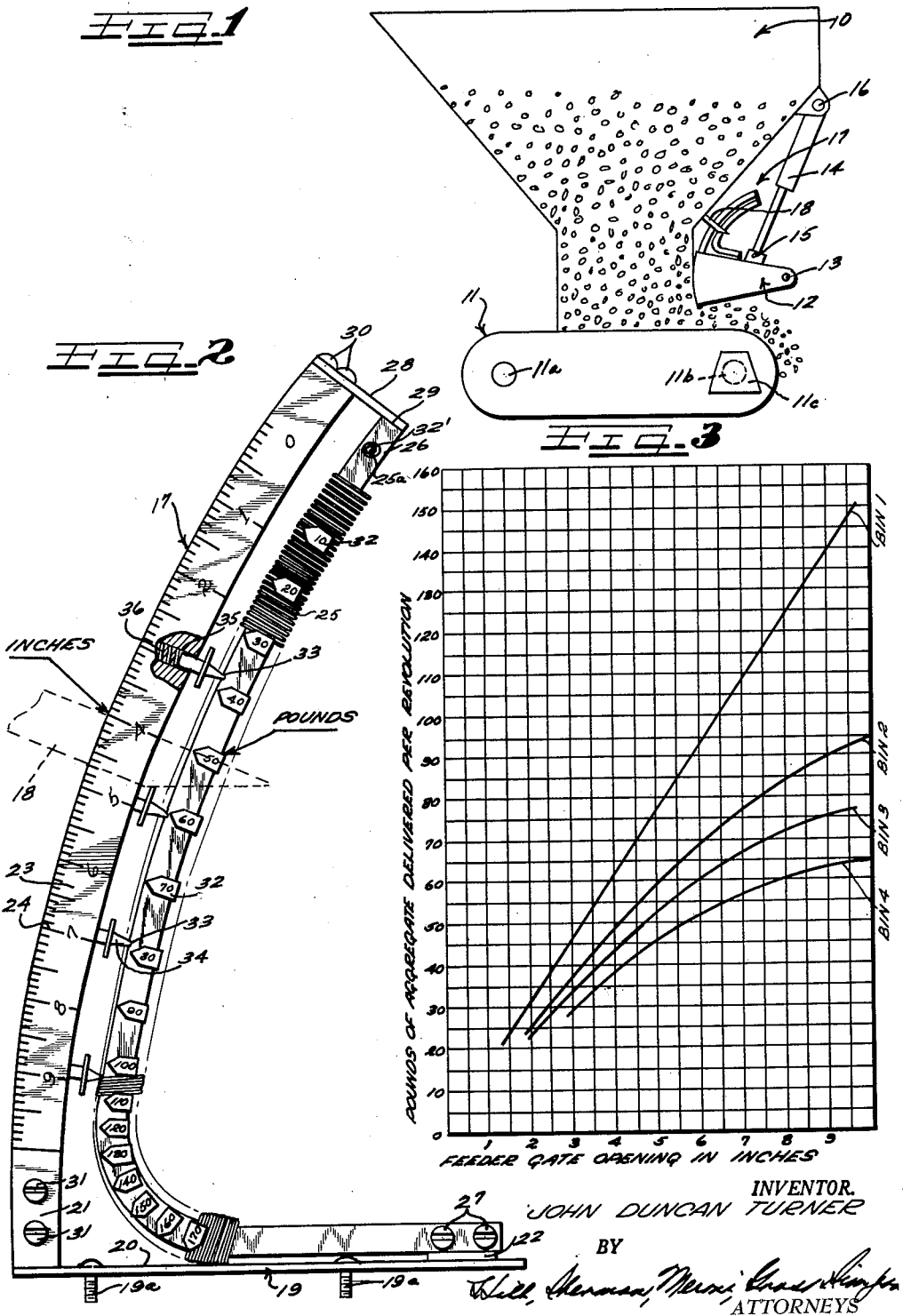

3,128,014
VARIABLE CALIBRATION SCALE FOR
MEASURING BULK MATERIALS
John Duncan Turner, Aurora, Ill., assignor to Barber-Greene Company, Aurora, Ill., a corporation of Illinois
Filed Oct. 2, 1961, Ser. No. 142,395
20 Claims. (Cl. 222—29)

This invention relates to variable calibration devices or scales for measuring flow from an orifice which flow may comprise bulk materials for asphalt plants of both the "continuous" and "batch" types. This invention further relates to a new and improved asphalt plant control mechanism for regulating the aggregate being discharged from aggregate bins into a pugmill.

There are two types of asphalt plants which are commonly used in industry including a continuous type asphalt plant and a batch type asphalt plant. The subject matter of the present invention concerns a calibration device adapted for use in a continuous type asphalt plant as shown in the Harry A. Barber U.S. Patent 2,344,228. The subject matter of the present invention further concerns a scale for use in a batch type plant of the type shown in the Harry A. Barber et al. U.S. Patents 2,893,600, 2,893,601, and 2,893,602 and the J. F. Sauer U.S. Patent 2,873,955. All asphalt plants operate similarly up to the point of measuring and mixing. Aggregate is fed from storage to the dryer, which removes the moisture and heats the aggregate. The heated, dried aggregate is continuously fed to vibrating screens which divide it into the specified separations. Each separation flows into its respective bin. So far the principles of continuous and batch type plants are identical. The next steps are measuring and mixing.

In the intermittent or batch type plant, the flow of materials is stopped. Each separation of aggregate, and the asphalt are individually measured, and then discharged as segregated masses into the mixer or pugmill, which mixes each batch separately and discharges to the truck.

In the continuous plant, the flow of materials is not interrupted. The specified amount of each separation of aggregate, and the specified amount of asphalt are continuously fed into the mixer or pugmill in an intermingled stream. From the pugmill, the finished mix is discharged into trucks.

Thus, the main difference between a continuous type asphalt plant and a batch type asphalt plant is that a continuous plant transmits a continuous stream of aggregate into the pugmill for mixing with bitumen whereas in a batch type asphalt plant a given quantnity of aggregate is transmitted or conveyed with bitumen to a pugmill and mixed as a batch whereupon it is discharged from the pugmill and the operation is then repeated whereby successive batches are produced.

Prior to the present invention it was necessary that each size of aggregate being conveyed to the pugmill be measured by weight.

According to the present invention new and improved variable calibration devices or scales have been developed for use with both types of asphalt plants. The scales may be mounted directly on the bins or at a remote control point.

According to the present invention, it is an important object to provide a scale which visually indicates the number of pounds of aggregate being discharged from the gate instead of the inch size of the gate opening.

Still another object of this invention is to provide a scale for a continuous type asphalt plant which indicates the number of pounds being discharged from the storage bin per revolution of the conveyor drive shaft.

A still further object of this invention is to provide a new and improved scale for use with a batch type asphalt plant which scale indicates gate discharge in terms of pounds.

Yet another important object of this invention is to provide a new and improved calibration scale or device which may be mounted on the gate of an aggregate bin or which may be disposed at a control station remote from the aggregate bin.

Still another very important object of this invention is to provide a variable calibration scale which may be set and read directly in pounds of aggregate instead of inches of gate opening.

A further very important object of this invention is to provide a new and improved variable calibration scale which can be readily explained to its owner, its operator, the highway department inspectors, to various public officials, to consulting engineering firms and the like so that these people will have confidence in the reliability and accuracy of the asphalt plant whether it be the continuous or batch type asphalt plant.

According to the general features of this invention there is provided a calibration device for use in connection with an adjustable gate on an aggregate bin and which device includes an elongated measure element with fixed units of measurement along the length thereof representative of different degrees of gate opening. The device further includes a variable element of measurement comprising a stretchable member or coil spring having convolutions thereof arranged into predetermined segments each representative of a given amount of aggregate for a given unit of measurement on the fixed element. The device further includes a series of adjustable indicating elements or means cooperable with the coils for maintaining the coils in spaced predetermined relation with respect to one another. An indicator is also provided on the device which indicator extends crosswise of the aforesaid elements and is movable in response to variations in the opening of the bin gate.

According to still further features of the present invention, the convolution of the stretchable member are movable with respect to the elongated measure element and the adjustable indicating elements are engageable with the convolutions of the stretchable member and are movable in and out of engagement with the convolutions permitting adjustment of the coils with respect to the elongated measure element.

Other objects and features of this invention will more fully become apparent in view of the following detailed description taken in conjunction with the accompanying drawings illustrating therein several embodiments, and in which:

FIGURE 1 is a side elevation of an aggregate bin for an asphalt plant having my novel variable calibration scale mounted thereon;

FIGURE 2 is an enlarged side elevation of the variable calibration scale with the marker being indicated in dotted lines;

FIGURE 3 is a graph showing the relationship of the size of opening of a feeder gate with respect to the amount of aggregate discharged per revolution of a conveyor drive shaft in a continuous type asphalt plant;

FIGURE 4 is a perspective view of certain elements of a modified type of continuous asphalt plant where the scale is remote from the aggregate bin;

FIGURE 5 is a fragmentary side elevation of a control panel for a batch type asphalt plant with an aggregate bin being shown in section; and FIGURE 6 is an enlarged fragmentary cross-sectional view taken substantially on the line VI—VI looking in the direction indicated by the arrows as shown in FIGURE 5.

As shown on the drawings:

For simplicity, we will first describe the device as it is used in continuous asphalt plants. Part of the function of the continuous asphalt plant is to continuously measure out the required quantity of each of the several sizes of mineral aggregate, and the correct proportion of asphalt.

The reference numeral 10 in FIGURE 1 indicates generally one of a series of aggregate bins which are mounted in bank and usable with an asphalt plant which operates on a continuous principle rather than on a batch principle. The bin 10 is supported over an apron feeder or conveyor 11 mounted on shaft 11a and drive shaft 11b. A drive shaft revolution counter 11c is mounted on the drive shaft 11b. The drive shaft 11b is driven by a suitable power source and as it operates the conveyor 11, it also operates an asphalt metering pump (not shown) which pump pumps a specified amount of asphalt for each revolution of the drive shaft 11b. The aggregate and asphalt are then mixed in a pugmill, as shown in the aforesaid patents.

A gate 12 is pivotally mounted at 13 at the bottom end of the bin 10 to enable the conveyor to discharge aggregate through the gate opening. A ram type cylinder 14 preferably of the hydraulic type is pivotally mounted at one end 16 to the bin 10. The piston rod end of the cylinder 14 is pivotally connected to the gate 12 at 15.

According to the present invention, a calibration device indicated generally at 17 is mounted on the bin 10. The calibration device 17 includes a marker 18 which is fixedly mounted on a wall of the bin 10. A scale unit 19 is secured to the gate 12 by means of screws 19a (FIGURE 2). With the operation of the cylinder 14, the gate 12 as well as the scale unit 19 are adapted to be pivoted on the gate pivot 13 whereby the scale unit 19 moves in an arc with respect to the marker 18 to indicate the size of gate opening and the number of pounds of aggregate being discharged from the bin 10 onto the apron conveyor 11 per revolution of the drive shaft 11b.

The scale unit 19 includes a base 20 and the screws 19a extend through the base for attachment to the gate 12. At opposite ends of the base are base attachment angles 21 and 22. Mounted on the base 20 is an arcuate elongated measure element 23 having fixed units 24 of measurement along the length thereof. Disposed immediately adjacent to the element 23 is a variable element of measurement comprising a coil spring 25. The spring 25 is mounted on a curved scale rod 26 which is secured at its base end to the attachment angle 22 by means of fasteners 27. A rod plate 28 is welded to the rod 26 at 29 and the opposite end of the rod plate is secured by means of fasteners 30, 30 to one end of the elongated measure element 23. The opposite end of the elongated measure element 23 is secured to the attachment angle 21 and to the base 20 by means of the fasteners 31—31.

One end 25a of the coil spring 25 is secured to the rod 26 by means of a fastener 32'. An opposite end of the coil spring is left free to slide on the rod 26 to permit the spring to be adjusted along the length of the rod 26. The spring 25 may be made from any suitable material such as a phosphorous type of bronze. The curved rod 26 is of sufficient length so that a spring 25 having four hundred or more convolutions may be mounted thereon.

In order to identify the convolutions of the coil spring 25, a series of coil marker tabs 32 are welded to the wire coil spring preferably on every tenth convolution. The rod 26 is also provided with a series of spaced sockets 33 and the elongated measure element 23 is provided with a series of spring actuated adjustable indicating elements 34. It will be noted that one end of each of the indicating elements 34 is adapted for engagement in an associated socket 33 on the rod 26 and that an opposite end of the element 34 is engaged in a socket 35 in the elongated measure element 23. The adjustable indicating elements 34 are free to move between the elongated measure element 23 and the rod 26 and a spring 36 is disposed in each of the sockets 35 and engaged against the associated adjustable indicating element 34 to urge the element 34 into the rod socket 33.

In the illustrated form of the invention, the variable element of measurement is shown and described as comprising a coil spring 25. It will be appreciated, however, that for the purposes of the present invention that the variable element of measurement may also comprise other types of stretchable members such as a rubber strip or other elastic materials.

*Scale Operation for Continuous Type Asphalt Plant*

It is necessary that each size of aggregate be measured by weight. In the continuous plant, each gate on a bank of aggregate bins is set to deliver the required number of pounds per revolution of the drive shaft of its apron feeder.

Heretofore, it has not been possible to graduate the various positions of each adjustable gate in pounds. Various aggregates (sand, gravel, crushed stone, etc.) have different specific gravities. In addition, even the same aggregate material crushed to different particle sizes will not weigh the same per cubic foot. Further, the flow characteristics of various aggregates vary depending on their specific gravity, shape of particle and mixture of sizes within a given bin. Still further, with a given aggregate, apron feeder, and gate, the number of pounds per revoluiton of the feeder drive shaft conveyed through the adjustable gate does not increase in direct proportion to increases in gate opening. In other words, if the gate were opened 3", and delivered 30 pounds per revolution, it would not necessarily deliver 60 pounds per revolution at 6" of gate opening.

On the other hand, in spite of the many factors affecting the number of pounds per revolution delivered at a given gate opening, the result is consistent for a given material at a given gate opening. In other words, a given type and particle size of aggregate that feeds at the rate of 30 pounds per revolution at a 3" gate opening, will continue to deliver this number of pounds at this gate opening within very close tolerances. If the gate is temporarily opened wider to increase the flow, and then returned to the 3" opening, it will resume the 30 pounds per revolution within very close limits.

If in the same example, the gate is opened to 6", and delivers 52 pounds per revolution, it will continue to deliver consistently at this rate.

The scale 23 indicating the opening of each gate is graduated in inches and 10ths of inches. The gates on the bins 10 are calibrated by running tests at various gate openings. During the tests, the flow of aggregate from each bin is diverted into separate test buckets. The weight of the contents of each bucket is divided by the number of revolutions run during the test, recorded by the revolution counter 11c. This gives the number of pounds of aggregate fed per revolution from each gate, at each opening tested. The results are plotted on a graph as shown in FIGURE 3. The gate opening required to deliver the desired weight of aggregate from each bin per revolution is later read from the graph. A typical graph for a bank of all four bins such as bin 10 is shown in FIGURE 3. The graph is not necessary with the calibration scales.

Bin #1 usually contains the material with the smallest particle size—usually sand. Usually this material does increase in direct proportion to the gate opening, resulting in a straight line. In this case the test at 2" was 31 pounds per revolution, and the test at 4" was double or 62 pounds.

The #2 bin usually contains the next coarser material, #3 bin the next coarser, and the #4 bin, the material of the largest particle size. The size of particle for various types of mix vary considerably. The larger size for some mixes could be a fraction of an inch, and for others as large as 2 or 3 inches.

As indicated on the graph, as the particle size increases, the curve flattens out. For example, the #4 bin curve shows that the gate delivered 38 pounds at 4" and 52 pounds at 6" for an increase of 14 pounds. The next increment of 2" opening—from 6" to 8" increased the flow only 8 pounds to 60 pounds.

After the graphs are plotted, and the number of pounds per revolution required from each feeder established, the graph is used to determine the required gate opening in inches. For example, if 101 pounds were required from the #1 bin, the gate would be opened to 6.5". Similarly, if 50 pounds were required from the #4 bin, the gate would be opened 5.7". After the gates have been so set, test checks are made, sometimes requiring correcting adjustments in the individual gate openings.

After the plant is operating, it is frequently found desirable to "re-balance" the proportions while holding the total weight of aggregate, for example increasing the flow from the #2 bin by 8 pounds and reducing the #3 and #4 bin each by 4 pounds. This is frequently done by judgment in "tenths of an inch" on a trial and error basis, although it could be much more accurately done from the graphs.

Wtih varying degrees of frequency, it is desirable to change the plant to produce a new mix—using different proportions of the same aggregates which is done by reading the correct gate opening from the graph, etc.

In addition to the "inch scale" each gate is equipped with the stretchable spring 25 in which each coil represents 1 pound (FIGURE 2) equipped with locking devices at various gate openings. When the calibration tests are made, the spring is set and locked by manually engaging and desengaging the elements 34 in the sockets according to the results of each gate opening tested.

By way of further illustration, if the feeder is to deliver 79 pounds per revolution at the 7" gate opening, after setting of the spring scale, the mere opening of the gate results in the delivery of the required number of pounds. If 55 pounds were required, the gate would be opened until the indicator read 55 pounds.

*Remotely Located Variable Scales*

Scales such as shown in FIGURE 2 can be mounted on a control panel for operation of an aggregate bin, such as shown at 10' in FIGURE 4. The bin 10' includes a conveyor 11 which is identical to the one shown in FIGURE 1. The bin 10' is mounted on the conveyor and has a gate 12' which is fluid operated by means of a cylinder 14'. A cable 12" is connected at one end to the gate 12' and is stretched over one or more rollers 12a' and connected to a scale marker, such as indicated at 18 in FIGURE 2.

It will be noted that the remotely located scale for use with the gate 12' differs from the scale used with the gate 12 in that in this instance the marker 18 is adapted to move with respect to the scale unit whereas in the first form disclosed in FIGURES 1–3, the scale unit 19 moved with respect to the fixedly mounted marker 18. It will further be appreciated that in both forms shown in FIGURES 1–4, that little or no aggregate will be discharged from the bin when the apron feeder or conveyor 11 is not operated even though the gate may be slightly opened. In order to operate the bin of the continuous type asphalt plant it is necessary for the apron feeder or conveyor to be rotated to carry the aggregate out of the associated bin.

*Variable Scale for Batch Type Asphalt Plant*

The reference numeral 40 in FIGURE 5 indicates generally one of a series of aggregate bins. The bin 40 is of the type shown in FIGURE 5 of the H. A. Barber et al. U.S. Patent 2,893,600. Disposed above the weigh hopper or bin 40 is a supply chute 40a. The supply chute 40a has a hydraulically operated sliding gate 40b to permit aggregate to flow into the weigh hopper or bin 40 in a controlled manner.

The weigh hopper 40 includes a clam shell drop bottom comprised of a pair of swinging gates 42, 42 which are pivoted at 43 to the bin or weigh hopper 40. Disposed within the hopper 40 is a bin divider wall 42' which has a lower end 45 disposed in wiping engagement with the gates 42, 42 and which has an upper opposite end pivoted at 46 in assembly with the bin 40. By operating the fluid cylinder 44, the divider 42' can be moved into a selected position within the hopper 40 so that only a predetermined amount of aggregate can flow into the hopper 40 at any one time. Once the hopper 40 is filled, any excess material will merely overflow and be ultimately returned to the supply chute 40a.

The reference numeral 47 indicates generally a modified type of a variable scale or calibration device. The calibration scale 47 illustrated in the attached drawings can be for a continuous or a batch type plant in a location remote to the aggregate bin. The device includes a slidable marker 48 as well as a scale unit 49. The scale unit 49 is mounted on a base or control panel 50.

The device 47 further includes an elongated measure element 53 having fixed units 54 of measurement along the length thereof. Disposed immediately adjacent to the element 53 is a variable element of measurement comprising a stretchable member or coil spring 55. The spring 55 is mounted on a curved scale rod 56 by means of fasteners 57 which connect it to the control panel 50. While the rod 56 is shown as being curved, it will be appreciated that it could also be a straight rod, if desired.

Where a bin having an auxiliary compartment is employed, the coil spring 55 will differ from that shown in FIGURE 2 in that its opposite ends will be freely movable along the length of the spring. For the purposes of simplifying this patent disclosure, however, the zero coil is fastened to the rod 56. The stretchable element or spring may be made from any suitable material such as bronze, plastic, or the like. In order to identify the convolutions of the coiled stretchable element 55, a series of coil marker tabs 62 are secured to the coils on preferably every tenth convolution.

The rod 56 is provided with a series of spaced sockets 63 and the elongated measure element 53 is provided with a series of adjustable indicating elements 64 which are spaced along its length. One end of each of the indicating elements 64 is adapted for engagement in an associated socket 63 on the rod 56. An intermediate portion of the element 64 is in threaded assembly with a threaded socket 65 provided on the element 53. By turning the indicating element 64 at its knurled enlarged end 64a, the element 64 may be moved into and out of its associated socket to permit the coils to be moved along the length of the rod 56 into a selected adjusted position.

In order to permit the marker 48 to move along the length of the elements 53 and 55 a slide 70 is provided. The slide 70 includes a pair of slide rods 71 which are connected to slide end brackets 72, 72 and attached to the control panel by means of fasteners 73.

The marker 48 is secured on the slide 70 by means of a marker support 74. The marker support 74 has a pair of sockets 75 and the slide rods 71 are engaged in the sockets. One of the sockets 75 is provided with a pair of bearings 75a to permit the marker support 74 to move freely with respect to the slide rod 71. The marker 48 is secured to the marker 74 by means of a hinge pin 76 being engaged in hinge pin bosses 76a, 76a.

In order to connect the marker 48 with the bin divider 42', a cable 77 is stretched over rollers 78 with one cable end 79 being attached to the bin divider 42' and with an opposite cable end 80 being secured to an adjustable turnbuckle type clamp 81. The clamp 81 is secured to the marker support 74 by means of a fastener 82. Also secured to the marker support 74 is a spring 83 with an opposite end of the spring 83 being attached to the control panel or base 50. The spring 83 exerts a spring force against the marker to hold it in adjusted position.

To calibrate the bin 40, for example, the adjustable wall 42' is moved to its most closed or minimum position, the marker 48 would line up with the locking pin 64, on the extreme left. The bin 40 is then allowed to fill with material, struck off, and weighed. As an example, assume the weight to be 600 pounds. The spring scale is set and locked with the locking pin 64 at 600 pounds.

The wall 42' is then opened to its maximum position, and the bin is filled with aggregate and weighed and in this case the bin contains 3,000 pounds. The spring 55 is now stretched so the 3,000 pound spring marker 62 is in alignment with the gate marker 48 and locked with the locking pin on the right.

After the spring scale has been set as described above, the operator by means of the cylinder can move the adjustable wall 42' until the marker 48 on the scale designates the number of pounds needed whereupon the feeder chute can be opened to fill the bin in accordance with the job requirement.

In the continuous plant application, the fixed scale is graduated in inches which represent inches of gate opening, but in the batch plant application the fixed scale could be graduated with arbitrary numbers and it need not be graduated at all.

It will be understood that modifications and variations may be effected without departing from the scope of the novel concepts of the present invention.

I claim as my invention:

1. For use with an asphalt plant, an aggregate bin with an adjustable gate for controlling the amount of aggregate discharge from the bin, a calibration device for use in connection with said gate and comprising a first measure element, a variable element of measurement juxtaposed to and along the length of said first measure element comprising a coil spring having convolutions thereof arranged into predetermined segments each representative of a given amount of aggregate for a given unit of measurement on the first measure element, a series of adjustable indicating elements securable along the length of said elements for holding said convolutions at spaced intervals on the first measure element, and an indicator extending crosswise of said elements and movable in response to variations in the opening of the bin gate.

2. For use with an asphalt plant, an aggregate bin with an adjustable gate for controlling the amount of aggregate discharge from the bin, a calibration device for use in connection with said gate and comprising a first measure element, a variable element of measurement juxtaposed to and along the length of said first measure element comprising a coil spring having convolutions thereof arranged into predetermined segments each representative of a given amount of aggregate for a given unit of measurement on the first measure element, a series of adjustable indicating elements securable along the length of said elements for holding said convolutions at spaced intervals on the first measure element, and an indicator extending crosswise of said elements and movable in response to variations in the opening of the bin gate, the convolutions of the stretchable member being movable with respect to the first measure element and with said adjustable indicating elements being engageable with the convolutions of the stretchable member and being movable in and out of engagement with the convolutions of the stretchable member permitting adjustment of the variable element of measurement with respect to the first measure element.

3. In a calibration device, an elongated measure element, a variable element of measurement juxtaposed to and along the length of said elongated measure element comprising a coil spring having convolutions thereof arranged into predetermined segments each representative of a given value of a given unit of measurement on the elongated measure element, and a series of spring actuated indicating elements secured along the length of said elongated measure and each having an end engaged with and holding said convolutions at spaced intervals designating corresponding units of measurement on the elongated measure element.

4. In a calibration device, an elongated measure element, a variable element of measurement juxtaposed to and along the length of said elongated measure element comprising a rod having a coil spring mounted thereon, the spring having convolutions thereof arranged into predetermined segments each representative of a given value of a given unit of measurement on the elongated measure element, said rod having spaced sockets therein and a series of adjustable indicating elements secured along the length of said elongated measure element each having an end secured in one of said sockets on said rod for holding said convolutions at spaced intervals and for designating corresponding units of measurement on the elongated measure element.

5. In a calibration device, an elongated measure element with fixed units of measurement along the length thereof, a variable element of measurement juxtaposed to and along the length of said fixed element comprising a rod having a coil spring mounted thereon, the spring having convolutions thereof arranged into predetermined segments each representative of a given value of a given unit of measurement on the fixed element, said rod having spaced sockets therein and a series of adjustable indicating elements secured along the length of said elongated measure element each having an end secured in one of said sockets on said rod for holding said convolutions at spaced intervals and for designating the corresponding fixed units of measurement on the fixed element, said adjustable indicating elements being retractible with respect to said elongated measure element to permit the relationship of the convolutions on the coil spring to be altered with respect to said rod.

6. In a calibration device, an elongated measure element with fixed units of measurement along the length thereof, a variable element of measurement juxtaposed to and along the length of said elongated measure element comprising a rod having a coil spring mounted thereon, one end of said spring being fixedly mounted on said rod and with an opposite end of said spring being movable along the length of said rod, the spring having convolutions thereof arranged into predetermined segments each representative of a given value of a given unit of measurement on the elongated measure element, said rod having spaced sockets therein, and a series of convolution holding elements engaged with said convolutions for spacing said convolutions at spaced intervals on said rod and for designating the correspoding fixed units of measurement on the elongated measure element.

7. In a calibration device, an elongated measure element with fixed units of measurement along the length thereof, a variable element of measurement juxtaposed to and along the length of said elongated measure element comprising a coil spring having convolutions thereof arranged into predetermined segments each representative of a given value of a given unit of measurement on the elongated measure element, and a series of adjustable indicating elements securable along the length of said elements for holding said convolutions at spaced intervals and for designating the corresponding fixed units of measurement on the elongated measure element.

8. In a calibration device, an elongated measure element with fixed units of measurement along the length thereof, a stretchable element of measurement juxtaposed to and along the length of said elongated measure element having convolutions thereof arranged into predetermined segments each representative of a given value of a given unit of measurement on the elongated measure element, and a series of adjustable indicating elements securable along the length of said elements for holding said convolutions at spaced intervals and for designating the corresponding fixed units of measurement on the elongated measure element, said stretchable element having marker tabs secured to its convolutions providing indicia on said stretchable member.

9. For use with an asphalt plant, an aggregate bin with an adjustable gate for controlling the amount of aggregate discharge from the bin, a calibration device for use in connection with said gate and comprising an elongated measure element with fixed units of measurement along the length thereof representative of different degrees of gate opening, a stretchable element of measurement juxtaposed to and along the length of said elongated measure element having convolutions thereof arranged into predetermined segments each representative of a given amount of aggregate for a given unit of measurement on the elongated measure element, and means movable into and out of engagement with said convolutions for securing the convolutions in various stretched relationships with respect to one another for holding said convolutions at spaced intervals and for designating the corresponding fixed units of measurement on the elongated measure element, said device having an indicator extending crosswise of said elements and movable in response to variations in the opening of the bin gate.

10. In an asphalt plant including an aggregate bin with a cylinder operated adjustable gate for controlling the amount of aggregate discharge from the bin, a control panel, a calibration device mounted on said control panel for use in connection with said gate and comprising an elongated measure element for designating different degrees of gate opening, a stretchable element of measurement adjacent and disposed along the length of said elongated measure element having convolutions thereof arranged into predetermined segments each representative of a given amount of aggregate for a given unit of measurement on the elongated measure element, means movable into and out of engagement with said convolutions for securing the convolutions in various stretched relationships with respect to one another for holding said convolutions at spaced intervals and for designating corresponding units of measurement on the elongated measure element, said device having an indicator extending crosswise of said elements and movable in response to variations in the opening of the bin gate, connecting means connecting said marker with the adjustable gate.

11. In an asphalt plant including an aggregate bin with a cylinder operated adjustable gate for controlling the amount of aggregate discharge from the bin, a control panel, a calibration device mounted on said control panel for use in connection with said gate and comprising an elongated measure element for designating different degrees of gate opening, a stretchable element of measurement adjacent and disposed along the length of said elongated measure element having convolutions thereof arranged into predetermined segments each representative of a given amount of aggregate for a given unit of measurement on the elongated measure element, means movable into and out of engagement with said convolutions for securing the convolutions in various stretched relationships with respect to one another for holding said convolutions at spaced intervals and for designating corresponding units of measurement on the elongated measure element, said device having an indicator extending crosswise of said elements and movable in response to variations in the opening of the bin gate, connecting means connecting said marker with the adjustable gate, and a slide mounted on said control panel and with said marker being slidable on said slide lengthwise with respect to said stretchable element.

12. An asphalt plant including an aggregate bin with an adjustable bin member for controlling the amount of aggregate discharge from the bin, a control panel, a calibration device mounted on said panel for use in connection with said gate and comprising a first measure element, a variable element of measurement juxtaposed to and along the length of said first element comprising a coil spring having convolutions thereof arranged into predetermined segments each representative of a given amount of aggregate for a given unit of measurement on the first element, a series of adjustable indicating elements securable along the length of said coil spring for holding its convolutions at spaced intervals, an indicator extending crosswise of said elements, and a cable joining said indicator with the movable bin member in unison together.

13. An asphalt plant including an aggregate bin with an adjustable bin member for controlling the amount of aggregate discharge from the bin, a control panel, a calibration device mounted on said panel for use in connection with said gate and comprising a first measure element, a variable element of measurement juxtaposed to and along the length of said first element comprising a coil spring having convolutions thereof arranged into predetermined segments each representative of a given amount of aggregate for a given unit of measurement on the first element, a series of adjustable indicating elements securable along the length of said coil spring for holding its convolutions at spaced intervals, an indicator extending crosswise of said elements, and a cable joining said indicator with the movable bin member in unison together, the asphalt plant being of the continuous type and including a conveyor underlying said bin for transporting aggregate away from the aggregate bin, said coil spring having indicia attached to the convolutions along the length of said coil spring, said bin member comprising a bin gate.

14. An asphalt plant including an aggregate bin with an adjustable bin member for controlling the amount of aggregate discharge from the bin, a control panel, a calibration device mounted on said panel for use in connection with said gate and comprising a first measure element, a variable element of measurement juxtaposed to and along the length of said first element comprising a coil spring having convolutions thereof arranged into predetermined segments each representative of a given amount of aggregate for a given unit of measurement on the first element, a series of adjustable indicating elements securable along the length of said coil spring for holding its convolutions at spaced intervals, an indicator extending crosswise of said elements, and a cable joining said indicator with the movable bin member in unison together, the asphalt plant being of a batch type with the power operated bin member comprising a divider wall and having clam shell type gates below the divider wall, said coil spring having indicia attached to its convolutions indicating the number of units being discharged from the aggregate bin.

15. For use with an asphalt plant, an aggregate bin with an adjustable gate for controlling the amount of aggregate discharge from the bin, a calibration device for use in connection with said gate and comprising an elongated measure element with fixed units of measurement along the length thereof representative of different degrees of gate opening, a stretchable element of measurement mounted freely on a rod and with the stretchable element having convolutions thereof arranged into predetermined segments each representative of a given amount of aggregate for a given unit of measurement on the fixed element, a series of convolutions securing elements spaced along and securable along the length of said stretchable element and engaged with selected convolutions for holding said convolutions at spaced intervals, and a movable indicator extending crosswise of said elements and movable in response to variations of aggregate in the bin.

16. For use with an asphalt plant, an aggregate bin with an adjustable gate for controlling the amount of aggregate discharge from the bin, a calibration device for use in connection with said gate and comprising an elongated measure element with fixed units of measurement along the length thereof representative of different degrees of gate opening, a stretchable element of measurement mounted freely on a rod and with the stretchable element having convolutions thereof arranged into predetermined segments each representative of a given amount of aggregate for a given unit of measurement on the fixed element, a series of convolutions securing elements spaced along and securable along the length of said stretchable element and engaged with selected convolutions for holding said convolutions at spaced intervals, and a movable indicator extending crosswise of said elements and movable in response to variations of aggregate in the bin, both ends of said stretchable element being freely movable along said rod and securable in position by said spaced convolution securing elements.

17. For use with an asphalt plant, an aggregate bin with an adjustable gate for controlling the amount of aggregate discharge from the bin, a calibration device for use in connection with said gate and comprising an elongated measure element with fixed units of measurement along the length thereof representative of different degrees of gate opening, a stretchable element of measurement mounted freely on a rod and with the stretchable element having convolutions thereof arranged into predetermined segments each representative of a given amount of aggregate for a given unit of measurement on the fixed element, a series of convolutions securing elements spaced along and securable along the length of said stretchable element and engaged with selected convolutions for holding said convolutions at spaced intervals, and a movable indicator extending crosswise of said elements and movable in response to variations of aggregate in the bin, one end of said stretchable element being fixedly attached to said rod and with an opposite end freely movable along said rod and securable in position by said spaced convolution securing elements.

18. For use with an asphalt plant, an aggregate bin with an adjustable gate for controlling the amount of aggregate discharge from the bin, a calibration device for use in connection with said gate and comprising a first measure element, said device having a rod mounted alongside said first measure element, a stretchable element of measurement mounted freely on said rod and with the stretchable element having convolutions thereof arranged along the length of said rod each for representing a given amount of aggregate, a series of convolutions securing elements spaced along and securable along the length of said stretchable element and engaged with selected convolutions for holding said convolutions at spaced intervals, and a movable indicator extending crosswise of said elements and movable in response to variations of aggregate in the bin.

19. For use with an asphalt plant, an aggregate bin with an adjustable gate for controlling the amount of aggregate discharge from the bin, a calibration device for use in connection with said gate and comprising a first measure element, said device having a rod mounted alongside said first measure element, a stretchable element of measurement mounted freely on said rod and with the stretchable element having convolutions thereof arranged along the length of said rod each for representing a given amount of aggregate, a series of convolutions securing elements spaced along and securable along the length of said stretchable element and engaged with selected convolutions for holding said convolutions at spaced intervals, and a movable indicator extending crosswise of said elements and movable in response to variations of aggregate in the bin, said rod and said first measure element having associated sets of sockets and with said convolution securing elements being movable in said sockets.

20. A calibration device for use in connection with an asphalt bin gate and comprising a first measure element, said device having a rod mounted alongside said first measure element, a stretchable element of measurement mounted freely on said rod and with the stretchable element having convolutions thereof arranged along the length of said rod each representative of a given amount of aggregate, a series of convolutions securing elements spaced along and securable along the length of said stretchable element and engaged with selected convolutions for holding said convolutions at spaced intervals, and a movable indicator extending crosswise of said elements and movable in response to variations of aggregate in the bin.

References Cited in the file of this patent

UNITED STATES PATENTS

| | | |
|---|---|---|
| 851,241 | Linton | Apr. 23, 1907 |
| 1,422,925 | Carter | July 18, 1922 |
| 2,526,081 | Meincke | Oct. 17, 1950 |
| 2,526,921 | Ahblom | Oct. 24, 1950 |
| 2,883,958 | Du Bois | Apr. 28, 1959 |
| 2,893,600 | Barber et al. | July 7, 1959 |